United States Patent
Boudou et al.

(10) Patent No.: US 7,840,800 B2
(45) Date of Patent: Nov. 23, 2010

(54) METHOD AND SYSTEM FOR MODULE CHAINING CONTROL IN A MODULAR SOFTWARE ARCHITECTURE

(75) Inventors: Alain Boudou, Vert (FR); Christoph Siegelin, Paris (FR); Jean-Claude Marchetaux, La Queue Lez Yvelines (FR)

(73) Assignee: Gemalto SA, Meudon (FR)

( * ) Notice: Subject to any disclaimer, the term of this patent is extended or adjusted under 35 U.S.C. 154(b) by 1107 days.

(21) Appl. No.: 10/497,647

(22) PCT Filed: Dec. 11, 2002

(86) PCT No.: PCT/IB02/05325

§ 371 (c)(1),
(2), (4) Date: Jan. 11, 2005

(87) PCT Pub. No.: WO03/050660

PCT Pub. Date: Jun. 19, 2003

(65) Prior Publication Data

US 2005/0147046 A1 Jul. 7, 2005

(30) Foreign Application Priority Data

Dec. 12, 2001 (FR) .................................. 01 16055

(51) Int. Cl.
*H04L 29/06* (2006.01)
(52) U.S. Cl. ...................................................... 713/164
(58) Field of Classification Search .................. 713/164
See application file for complete search history.

(56) References Cited

U.S. PATENT DOCUMENTS

| 6,138,235 | A  | * | 10/2000 | Lipkin et al. ................. 713/155 |
| 6,629,315 | B1 | * | 9/2003  | Naylor ........................ 717/168 |
| 2002/0061108 | A1 | * | 5/2002  | Shinohara .................... 380/278 |
| 2002/0194389 | A1 | * | 12/2002 | Worley et al. ............... 709/310 |
| 2004/0039916 | A1 | * | 2/2004  | Aldis et al. ................. 713/177 |
| 2005/0114578 | A1 | * | 5/2005  | Lewis ......................... 710/260 |
| 2006/0253702 | A1 | * | 11/2006 | Lowell et al. ............... 713/156 |

* cited by examiner

*Primary Examiner*—Kambiz Zand
*Assistant Examiner*—Teshome Hailu
(74) *Attorney, Agent, or Firm*—Pehr B. Jansson; The Jansson Firm

(57) ABSTRACT

The method to check module chaining in a modular software architecture located in an electronic unit with microprocessor comprising, apart from the microprocessor, a memory space, uses an identification, secured by the hardware, of the calling module. The invention also concerns an electronic unit with microprocessor designed to implement the above method.

8 Claims, 4 Drawing Sheets

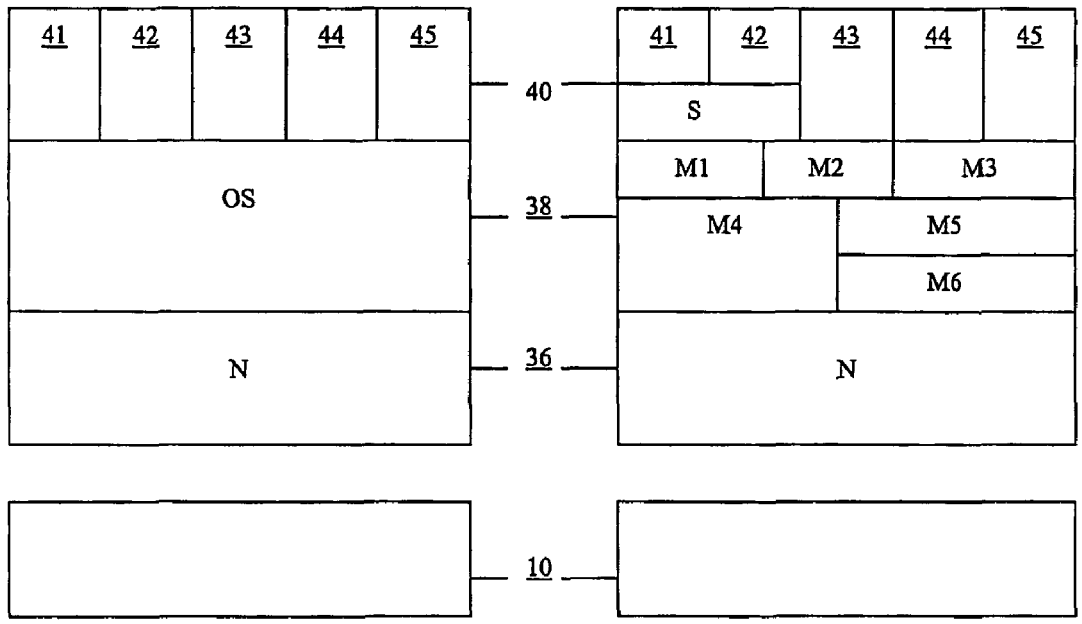
FIG. 3         FIG. 3 bis
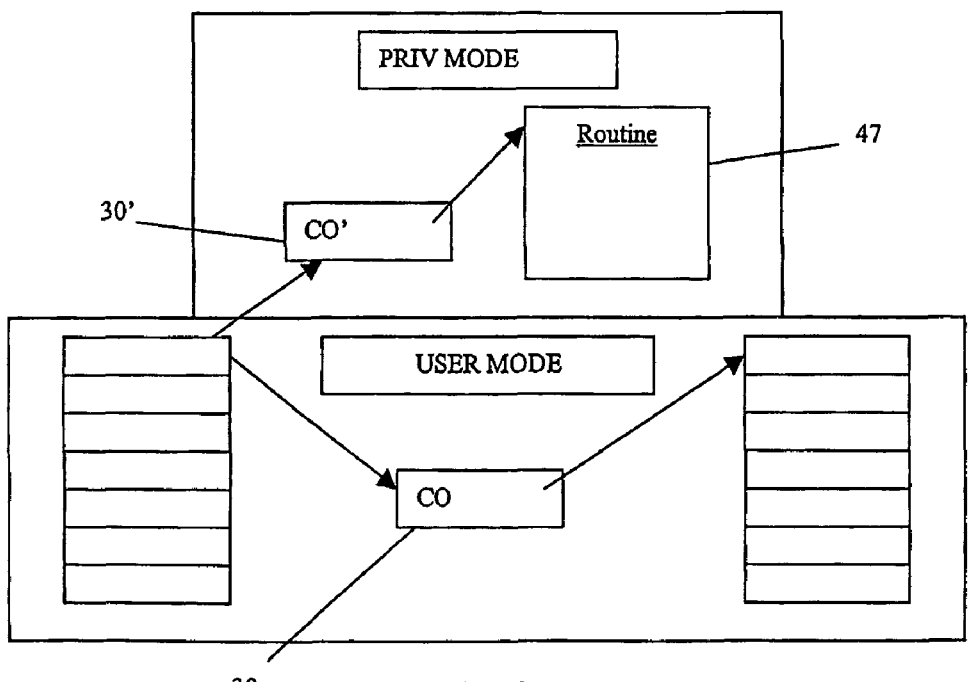
FIG. 4

METHOD AND SYSTEM FOR MODULE CHAINING CONTROL IN A MODULAR SOFTWARE ARCHITECTURE

BACKGROUND OF THE INVENTION

This invention concerns the module chaining control in a modular software architecture located in an electronic unit with microprocessor. The invention is for example applicable to, but not limited to, electronic smartcards.

1. Field of the Invention

A modular software architecture comprises several modules defined according to the tasks they have to execute. While executing its tasks, each module can call other modules. These modules can be grouped in layers, and in this type of model, the modules of a higher layer generally call the modules of the layer immediately below to process some of the tasks they must perform. In practice, for example, in a software architecture for smartcard, all modules can be grouped in three main layers called the "core" layer interfacing directly with the hardware (in particular the processor, memories and input/output interfaces), the "system" layer concerning the operating system (OS) and the "application" layer concerning the various software applications.

To each module there corresponds a particular, well identified memory area grouping memory sections to store the corresponding program (non volatile memory), memory sections to store the data associated with this module (non volatile memory) and memory sections exclusively used by this program for its execution (volatile memory). A unique identifier designates both a module and the corresponding memory area.

When a module calls explicitly another module by an inter-module call, execution of the calling module program is followed by execution of the called module program. Any other form of chaining the execution of programs belonging to different modules is prohibited by hardware mechanisms.

It may be necessary, especially for security purposes, to only allow certain clearly specified modules to call a given module. For example, a certain module in the core layer accessing the data memory can only be called by a module in the system layer and never by a module in the application layer, or a module in the application layer can only be called by a particular module in the system layer and never by another module in the same layer. Equally, according to another example, a module in the application layer, since it acts as card administrator, can request services that the other modules in the same layer are not allowed to obtain.

In the context of this type of limitation, since a calling module can call any other module, it is the called module or an intermediate system between the calling module and the called module which applies a check of program chaining. Consequently, the called module or the intermediate system must be able to reliably and unambiguously identify the calling module. In addition, the behaviour of the called module can be determined and configured according to the identity of the calling module obtained.

The identification of the calling module is secured if:
firstly, it does not rely on the "good faith" of the calling module (i.e. the information concerning the identification of the calling module communicated by said calling module is checked); and
secondly, the identification mechanism is protected against modification attempts carried out by malicious software likely to produce incorrect identification of the calling module.

2. Description of the Related Art

Software solutions to identify a calling module have already been proposed, in which a variable is used in the program to identify the active module. However, this purely software approach has certain disadvantages. Firstly, it is easily compromised, due to its purely software nature, by an impostor seeking to illegally benefit from the unauthorised resources either by modifying the identification variable in memory or by changing the program used to manage this variable. Secondly, with organisation in layers, although the operating system can easily identify applications since applications are run by said system, this is not the case for other identifications such as identification of modules in the operating system itself by the core: in this case, in fact, the information is not available.

The most common solution is to use cryptography to guarantee the identity declared by the calling module, i.e. use an authentication mechanism. However, in this case significant resources are required: a key known by the potentially called modules is required by each potentially calling module, as well as a cryptographic calculation for each call.

The invention concerns a method for secured identification of a calling module in a modular architecture which avoids the disadvantages described whilst remaining relatively simple.

SUMMARY OF THE INVENTION

The invention therefore proposes a method to check module chaining in a modular software architecture located in an electronic unit with microprocessor comprising, apart from the microprocessor, a memory space, characterised in that the check is carried out using an identification, secured by the hardware, of the calling module.

The invention concerns a method for secured identification of a calling module in a modular software architecture located in an electronic unit with microprocessor comprising, apart from the microprocessor, a memory space, characterised in that it consists, during an inter-module call, in saving information used to identify the calling module in protected memory before branching the execution to a precise point in the program of the called module and using the saved information to identify the calling module.

An inter-module call therefore triggers the execution of a routine which writes in memory information sufficient to identify the calling module then manages the jump to an address indexed by a parameter of the call. An advantage as regards the security is that any other type of jump from one module to another module is prohibited by the hardware.

The calls for a given module are therefore channelled into one or more specified entry points in order to systematically check the identity of the calling module and restrict access to authorised modules only, according to the previously stored check information.

The invention also concerns an electronic unit with microprocessor comprising at least a microprocessor and a memory space, the unit comprising hardware and software means designed to implement the identification method according to the invention as defined above in all its variants and/or execution modes. In particular, the invention is most suitable for use in microcontrollers located in smartcards.

The invention concerns an integrated circuit card comprising an electronic unit with microprocessor designed to implement the caller identification method according to the invention.

The invention concerns a computer program including program code instructions for the execution of steps of said method when said program is executed in a computer system.

BRIEF DESCRIPTION OF THE DRAWINGS

Other purposes, features and advantages of the invention will appear on reading the description which follows of the implementation of the method according to the invention and of a mode of realisation of an electronic unit with microprocessor designed for this implementation, given as a non-limiting example, and referring to the attached drawings in which:

FIGS. 3 and 3bis are diagrammatic representations of the modular software architecture of the electronic unit shown on FIG. 1;

FIG. 4 is a diagrammatic representation of a first form of realisation of the steps in the method according to this invention;

DESCRIPTION OF THE INVENTION

This invention belongs to the field of securing electronic units comprising at least a microprocessor, a non volatile memory of type ROM, EEPROM, Flash, FeRam storing at least a program to be executed, a volatile memory of type RAM and input/output means to communicate with the exterior. This type of unit is generally manufactured as a monolithic integrated electronic circuit, or chip, which once physically protected by any known means can be assembled on a portable object such as, for example, a smartcard, integrated circuit card or similar for use in various fields, especially the bank and/or electronic payment cards, mobile radio telephony, pay television, health and transport.

Figure 1:
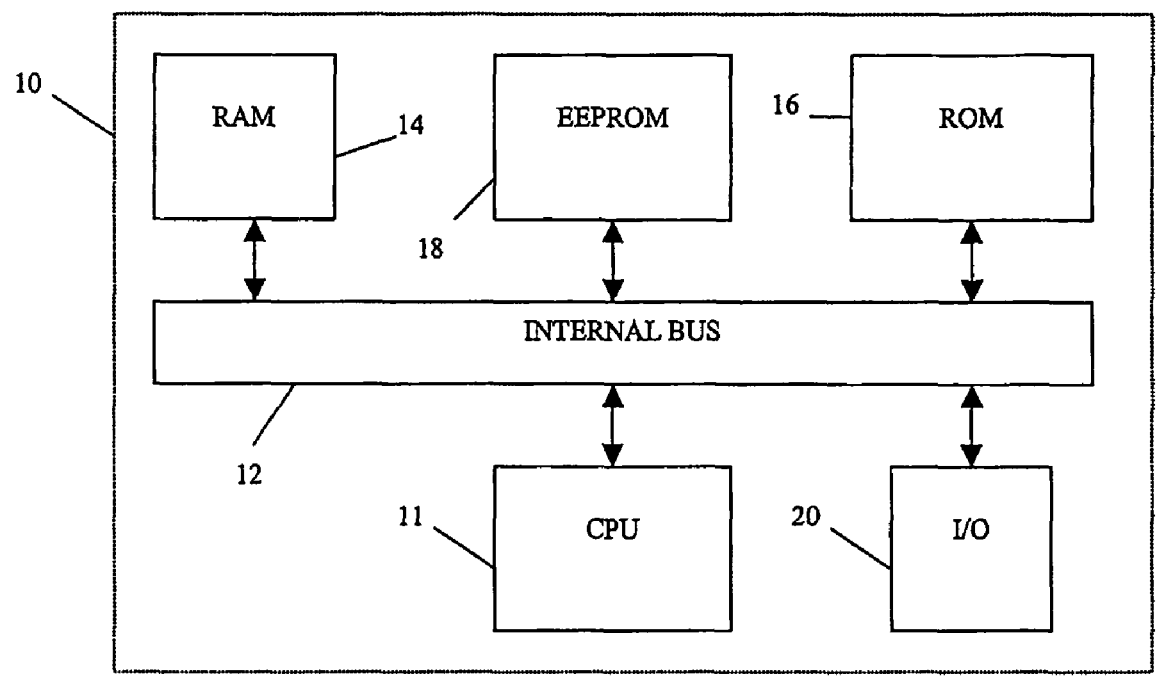
FIG. 1 is a diagrammatic representation of a non-limiting mode of realisation of an electronic unit with microprocessor designed to use the secured identification method according to the invention.

The monolithic electronic unit 10 with microprocessor illustrated on FIG. 1 and described as a non-limiting example generally comprises a microprocessor CPU 11 with two-way connection via an internal bus 12 to random access memory RAM 14, read only memory ROM 16, memory EEPROM 18 or similar and an input/output interface I/O 20. The module 10 may comprise additional components not shown, connected to the internal bus, such as for example a reversible counter or a pseudo-random number generator.

Figure 2:
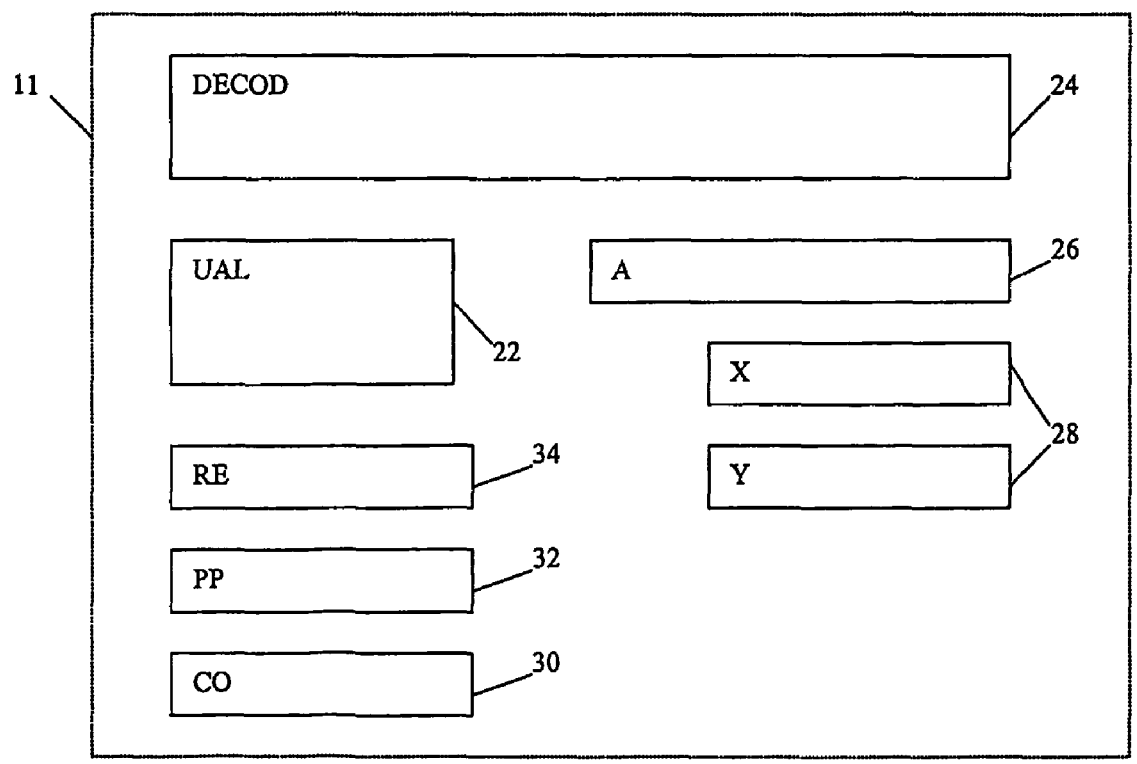
FIG. 2 is a diagrammatic representation of the central processing unit of the microprocessor shown on FIG. 1.

Traditionally, the central processing unit of the microprocessor CPU 11 illustrated on FIG. 2 comprises an arithmetic and logic unit UAL 22, an instruction decoding unit DECOD 24 and a set of working registers (such as for example in the CISC-Complex Instruction Set Computer-architecture in particular an accumulator A 26, at least a temporary storage register X and/or Y 28), a program counter CO 30 indicating the address of the next instruction to be executed, a stack pointer PP 32 indicating the storage address of the top of the stack of execution and a status register RE 34 providing various types of information on the instantaneous operational status of certain registers or other parts of the microprocessor CPU 11.

The memory space of the electronic unit 10 consists of the memory RAM 14, the memory ROM 16 and the memory EEPROM 18. This space stores various types of software organised as software modules according to a "modular" architecture and often represented as software layers (see FIG. 3). From the hardware layer consisting of the electronic unit 10, we can identify the "core" software layer ("N" on FIG. 3) 36 concerning amongst other things the microprocessor reset, input/output management, interrupt management, the operating system layer OS 38 concerning in particular the system configuration, organisation of system operation regarding applications, organisation of memory space and addressing, management of peripherals, and the "application" layer 40 with resident applications 41, 42 for example a program interpreter written in SUN MICROSYSTEMS JAVA language and "user" applications 43, 44 and 45 corresponding to precise features (example: bank card, health card, identity card).

According to the example illustrated on FIG. 3bis, the "application" layer 40 itself contains the services (S) shared by several applications and the "operating system" layer 38 is divided into modules (M1 to M6) corresponding to the major functions of this layer.

Regarding the memory addressing, the non volatile memory space is divided into memory pages, for example of 128 bytes, with partitions between the various areas where the various modules will be stored. Traditionally, the first non volatile memory area available which is the lowest addressing area is used to store an address table 46 (FIG. 6) giving the entry points of the interrupt and reset management routines commonly called the "interrupt and reset vector table". Each application module or user module has an addressing field storing the corresponding programs of the application as well as the fixed or variable data available to the application. The "user" applications 43, 44 and 45 can therefore be stored in the EEPROM memory. These applications which share layer 40 often include confidential data specific to them and which must be protected, for example payment codes for the bank cards, encryption keys for electronic signature payment cards or for pay television cards, personal information for the health cards. The integrity of each application, and more generally of each module including the OS and the core, must be protected by denying any unauthorised memory access in case of inter-module call. A patent application filed the same day as this application by the same applicant entitled "access control method and device in an embedded system" concerns this memory access control during an inter-module call. This access control starts with secured identification of the calling module.

An inter-module call is a call from a module known as the calling module to another module known as the called module.

Generally, an inter-module call is made by an instruction or executable procedure used to execute a resident program in a memory area different from the memory area of the calling module.

With modular architecture, the inter-module calls are immediately recognised as such being microprocessor instructions.

Figure 5:
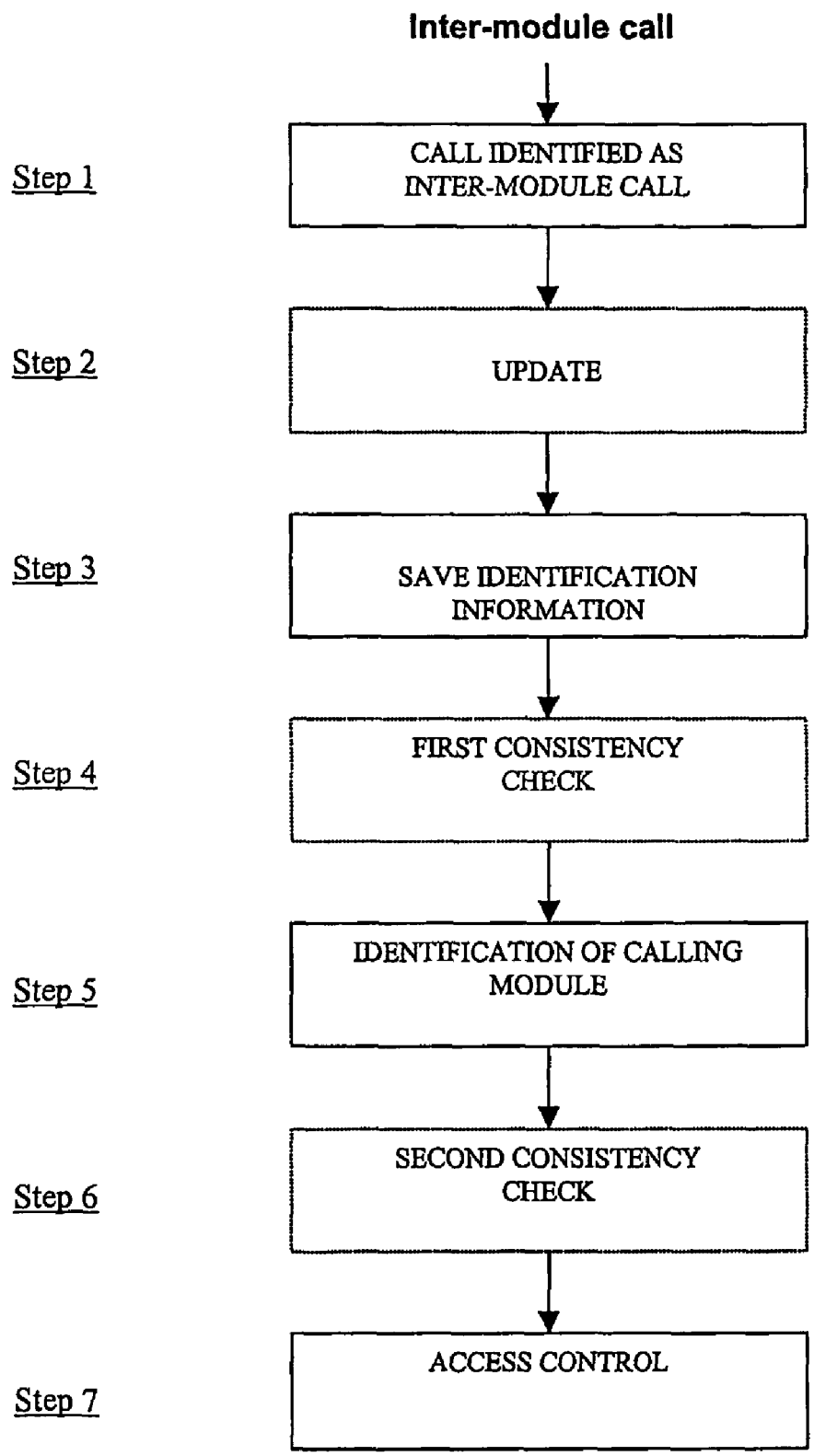
FIG. 5 is a flowchart representing the various steps of the secured identification method according to this invention.

Once the call is recognised as being an inter-module call, information used for identification, hereafter referred to as the identification information, is automatically saved (step 3 on FIG. 5). The inter-module call triggers said save. The calling module identification information is saved in protected memory before branching execution to a precise point in the program of the called module. The memory is protected as follows: The identification information is saved in one or more memory fields accessible in read only mode by programs such as for example the called module, the writes only being carried out by a save routine 47.

The information saved in the protected memory is used to identify the calling module. An inter-module call therefore triggers the execution of a routine which writes in memory information sufficient to identify the calling module then manages the jump to an address indexed by a parameter of the call. An advantage as regards the security is that any other type of jump from one module to another module is prohibited by the hardware.

The calls for a given module are therefore channelled into one or more specified entry points in order to systematically identify (step 5) the calling module and check the program chaining (step 7) according to previously stored check information.

According to several variants of the identification information save operation (step 3), the content of one or more registers of the central processing unit in the microprocessor 11 is stored. At least the contents of the program counter CO 30 and/or CO' 30' or of the status counter RE 34 are stored.

Execution of the routine 47 saving the identification information, which is triggered by the inter-module call, must not disturb said information and in particular the content of the program counter or of the status register.

Consequently, according to a first form of realisation of the method illustrated on FIG. 4, the save routine is executed in a mode different from that of the other modules: the save routine 47 is executed in privileged mode (or system mode) ("priv mode" on FIG. 4), using a different program counter 30'. The save routine 47 saves the identification information by carrying out execution using the program counter 30'. The memory used by the routine 47 to save the identification information is protected since said routine works in privileged mode i.e. in a mode where the code and the data cannot be accessed by programs which do not execute in privileged mode, such as the user programs (for example the calling module). The routine 47 then identifies the calling module and checks the program chaining. Note that the called module can carry out the identification and program chaining check steps itself. Said form of realisation is used to save the identification information of application modules executing in ordinary (or user) mode, and therefore to identify them. However, it cannot be used to identify modules which are executed in privileged mode.

Figure 6:
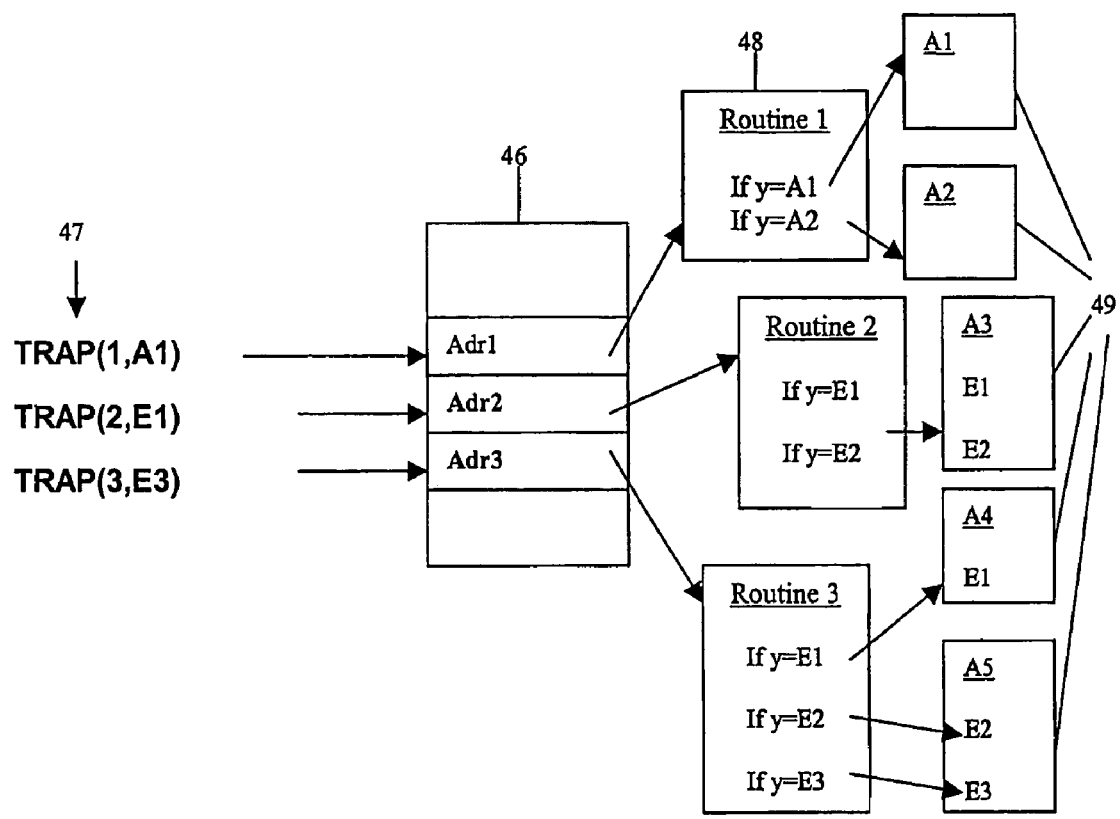
FIG. 6 is a diagrammatic representation of a second form of realisation of the steps in the secured identification method according to this invention.

Consequently, according to a second preferred form of realisation of the invention illustrated on FIG. 6, to identify all types of software module, the execution of the routine should be handled by the hardware, in particular the inter-module call instruction should belong to the preprogrammed microcode instruction set of the microprocessor. The whole checking method is performed automatically and secured by hardware means.

According to a mode of realisation of the method according to the invention, the inter-module call instruction is based on a "TRAP" type interrupt instruction or a similar "capture" type instruction belonging to the preprogrammed microcode instruction set of the microprocessor. During an inter-module call, the TRAP instruction is run automatically. The TRAP or similar instruction saves the identification information of step 3 in a protected memory. As indicated above, the memory is protected since it can only be accessed in read mode, the writes only being authorised to the microcode of the save routine 47 (TRAP).

Advantageously, the TRAP instruction or the similar instruction triggers the execution of a program interrupt management routine 48 known as the identification and program chaining check routine 48 specified in the stored predefined vector table 46 indicating the address of the entry point of said routine 48.

As shown on FIG. 6, the TRAP instruction or any similar instruction includes one or more call parameters (in the example of FIG. 6, two parameters x,y, TRAP(x,y)) which specifies the type of inter-module call, each call type triggering the execution of different identification and program chaining check routines 48 whose entry points are indexed in the vector table 46. The parameters x,y of the TRAP instruction determine respectively the identification and program chaining check routine 48 and the called module 49 to which said routine branches or an entry point in said called module 49 when there are several of them.

In the example illustrated on FIG. 6, the first parameter x indicates an entry in the vector table 46. TRAP(1,A1) points to entry 1 of table 46: entry 1 specifies the address of the identification routine "Routine 1" i.e. Adr1. Similarly, TRAP (2, E1) and TRAP(3, E2) point respectively to entries 2 and 3 which specify respectively the addresses of "Routine 2" and "Routine 3". The second parameter is a variable used by the identification routine 48 to determine the called module or a particular entry point in said called module; at the end of routine 48 "Routine1", the called module in which the program continues varies depending on the value of the second parameter. Consequently, in routine "Routine1", if the value of parameter y is A1, which is the case on FIG. 6, routine "Routine 1" branches to module 49 called A1 in which the program execution continues. If the value of parameter y is A2, routine "Routine 1" branches to module 49 called A2. In routine 48 "Routine2", if the value of parameter y is E1, routine "Routine 2" branches to entry point E1 of module 49 called A3. If the value of parameter y is E2, routine "Routine 2" branches to entry point E2 of the same module A3. In routine 48 "Routine3", if the value of parameter y is E3, routine 48 "Routine 3" branches to entry point E3 of module 49 called A5. If the value of parameter y is E2, routine "Routine 3" branches to entry point E2 of the same module A5. If the value of parameter y is E1, routine "Routine 3" branches to entry point E1 of another module called A4.

If the called module is not explicitly identified (for example a module belonging to the core or to the OS), the TRAP instruction points in the interrupt vector table 46 to a default entry point.

Note that the identification and program chaining check routine 48 can belong to the called module. The TRAP instruction points in the vector table 46 to a unique entry point, specific to a called module: said entry specifies the address of an identification and program chaining check routine specific to the called module.

The calling module identification and program chaining check steps 5 and 7 are carried out according to the form of realisation described above either by the save routine 47, by the identification and program chaining check routine 48, or by the called module itself.

The method according to the invention consists in step 5 of identifying the calling module. Module identification is carried out by a unique identifier which characterises firstly the tasks which can be executed by this module and secondly the memory area corresponding to this module. Management of the association between addresses belonging to a memory area and identifier is either centralised in a table, known as the identifier table, or decentralised as an identification attribute including this identifier attached to each address or group of contiguous addresses called a memory page, the identification attribute showing the identification of the module to which the address or the memory page belongs.

According to one form of realisation of step 3 of the method according to the invention, the information saved used to identify the calling module in step 5 (identification information) consists in the content of at least one of the following registers associated with the microprocessor: the program counter CO, the status register RE, said identification information save operation consisting in storage of the content of at least one of said registers.

According to a first realisation variant of identification step 5, identification of the calling module is carried out using the content of the program counter 30 which indicates the address of the next instruction in the program currently being executed in the calling module. In case of centralised management, with the identifier table indicating the addressing areas of the various applications, using comparison operations it is easy to find the addressing area of the calling module and identify the corresponding application. In case of decentralised management, identification is carried out by reading the identification attribute attached to the address saved.

Note that, in the form of realisation illustrated on FIG. 6, the content of the program counter 30 is stored in a memory field accessible by the called module or the routine 48 in read only mode (write is only authorised for the TRAP instruction microcode, i.e. the save routine 47).

According to a second realisation variant of step 5, the calling module is identified by an identifier contained in the status register and saved when the identification information is saved. In practice, the bits in the status register not used by the system are used to store the calling module identifier before saving the content of the status register.

Note that, in the form of realisation illustrated on FIG. 6, the content of the status register 34 (indicating the calling module identifier directly) is stored in a memory field accessible by the identification and program chaining check routine 48 and by the called module in read only mode (write is only authorised for the TRAP instruction microcode, i.e. the save routine 47).

As shown on FIG. 5, a second step consists in updating the status register before any identification. Step 2 is represented in dotted lines since it only belongs to the method according to the second form of realisation. The update of the status register is activated by the inter-module call. The identifier stored in the status register RE is automatically updated from an address in the calling module program, either by comparison in the identifier table in case of centralised management, or by reading the identification attribute of the page containing the inter-module call instruction in case of decentralised management of the association. An advantage as regards the security is that this address can be that stored in the program counter CO at the time of the inter-module call.

Consequently, the second realisation variant allowing the hardware to update the identifier avoids code duplication and the possibility of programming error and simplifies the task of the called module which accesses the calling module identifier directly.

During a seventh step, the method according to the invention checks whether the calling module identified in step 5 is authorised to access the called module. Depending on the form of realisation, the program chaining check is carried out:
by the save routine 47;
by the identification and program chaining check routine 48;
or by the called module.

Routine 47 or 48 or possibly the called module looks in a program chaining authorisation table amongst the various modules whether the calling module is authorised to call the called module. The program chaining authorisation table is predefined and stored in read only, except for a particular module with administration rights and which has write access to said table.

If program chaining is authorised, routines 47 and 48 branch to a specified point of a given called module from which execution continues when said routine 47 or 48 is finished. If a check is carried out by the called module itself, execution of the module continues when said check is finished. In the event of failure, the program of the called module is stopped and a warning message is returned to the calling module.

Figure 7:
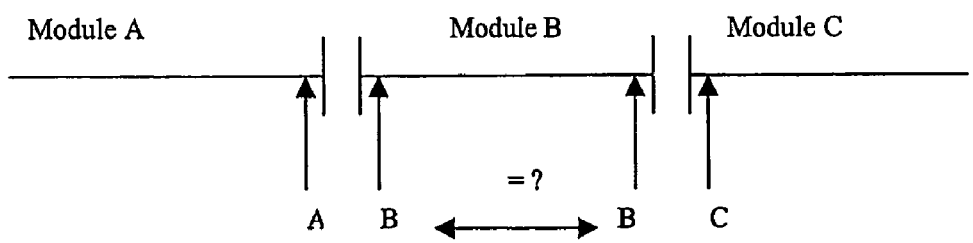
FIG. 7 represents an optional step in the secured identification method according to this invention.

Optionally (as indicated by the dotted lines on FIG. 5) but advantageously for security reasons, in a fourth step the method according to the invention carries out a first consistency check. The identification information is saved both for the calling module and the called module. As shown on FIG. 7, a calling module B calls a called module C, the calling module B having been called by a calling module A. Module B has two items of identification information, that of the start (at the time of the inter-module call A/B, when execution of module B starts) and that of the end (at the time of the inter-module call B/C, when execution of module B ends) of its continuous execution sequence. The consistency check is carried out at the time of the inter-module call (in this case the call B/C): the identification information regarding the start and end of module B, and more especially the identifier of module B at the start and end of sequence, are compared. Any difference in identifier indicates inconsistency which could be due to external attack: as a result, the current program is stopped automatically and a warning message is output.

Optionally (as indicated by the dotted lines on FIG. 5) and as a final check, in a sixth step a second consistency check is carried out. The operation consists in comparing the presumed identification of the calling module obtained using software (see above for example identification variable) and the identification of this module obtained by reading the saved identification information. Any discrepancy could be considered as a sign of external hardware and/or software attack and, as a result, program execution is stopped and/or an error message output.

The method used to identify the calling module which has just been described as a non-limiting example in its two main variants (FIG. 4 and FIG. 6) can be modified to suit the requirements of the modular software architecture designer as long as the identification information is saved by a privileged instruction, preferably microcoded in a memory, properly protected against external attacks. In particular, without leaving the scope of the invention, it is possible to limit the save of the identification information to that of a single register, the program counter or the status register, depending on the location of the information concerning the calling module to be retrieved for the remainder of the processing.

The invention also concerns the electronic units 10 with microprocessor, especially the microcontrollers, comprising at least a microprocessor 11 and a memory ROM 16 and/or a non volatile memory 18 (for example EEPROM) comprising at least an application program to be executed, the unit 10 comprising the hardware and software means designed to implement the caller identification method described above and the smartcards in which these electronic units are fitted.

The invention therefore concerns a method for secured identification of a calling module in a modular software architecture. The method consists, during an inter-module call, in saving information used to identify the calling module in protected memory before branching the execution to a precise point in the program of the called module and in using the saved information to identify the calling module and check the module chaining.

The method consists in triggering the execution of a routing 47 which writes in said protected memory said identification information and manages alone or via a program interrupt management routine 48, known as an identification and program chaining check routing, the jump to the program of the called module.

In this particular embodiment, the whole checking method is carried out automatically and secured by hardware means.

The save routine 47 triggers execution of the identification and program chaining check routine 48, specified in a stored predefined vector table 46 indicating the address of the entry point of said routine 48.

The saved information used to identify the calling module consists in the content of the program counter which indicates the address of the next instruction in the program currently being executed in the calling module and in that the method consists in:

in case of centralised management, finding from said address by comparison operations the identification of the calling module using the address field of the calling module in the memory space, via an identifier table;

in case of decentralised management, finding the identification of the calling module by reading an identification attribute attached to said address, the attribute showing the identification of the calling module.

According to another form of realisation, the information saved used to identify the calling module is an identifier of the calling module stored in the status register 34 and updated before saving said identification information as follows:

in case of centralised management, using the memory field of the calling module, said field being defined by pages of the memory space associated with an identifier specific to the module considered, the identifiers of all system modules being stored in an identifier table;

in case of decentralised management, from the attribute associated with the page storing the inter-module call instruction, the attribute showing the identification of the module to which the memory page belongs.

When the identification information is saved, a consistency check consists in saving both the identification information of the called module and of the calling module so that a module is characterised by information identifying it at the start and end of its execution and in comparing the identifiers of the module characterising the start and end of its execution.

A consistency check is carried out after identifying the calling module between the identification obtained via the save of said identification information and the identification obtained using software via an identification variable.

Although specific embodiments of the invention have been described and illustrated, the invention is not to be limited to the specific forms or arrangements of parts so descried and illustrated. The invention is limited only by the claims.

The invention claimed is:

1. Method to check module chaining in a modular software architecture located in an electronic unit (10) with microprocessor (11) comprising, apart from the microprocessor, a memory space (14, 16, 18), the method comprising:

in response to execution of an inter-module call instruction belonging to the instruction set of the microprocessor, triggering execution of a save routine in privilege mode allowing writing to otherwise read-only memory by the inter-module call instruction belonging to the microprocessor's instruction set, from within the execution of the save routine executing in privilege mode, before branching the execution of the calling module to a precise point in the program of the called module:

automatically writing, with hardware means, information used to identify the calling module in a memory location that is read-only to programs not executing in privilege mode and that is used to store calling program information, the written calling module identification information being hardware secured, identifying an identification and program chaining check routine specific to the called module among several identification and program chaining routines; and using the identified identification and program chaining check routine, checking said written identification information of the calling module.

2. Method according to claim 1, comprising:

managing the jump to the program of the called module, using said save routine (47) alone or via a program interrupt management routine (48), known as an identification and program chaining check routing routine.

3. Method according to claim 1, wherein the checking is carried out and secured with hardware means.

4. Method according to claim 1, wherein the saving comprises saving said identification information of the calling module in a protected memory, i.e., in one or more protected memory fields accessible in read only mode, carrying out the writes only by a routine (47) which saves said identification information while executing in a privilege mode that allows writing into said protected memory fields.

5. Method according to claim 1, wherein the saved information used to identify the calling module consists in the content of at least one of the following registers associated with the microprocessor (11): the program counter CO (30), the status register (34), the inter-module call triggering the storage of said identification information of the calling module via the content of at least one of said registers.

6. An electronic unit (10) with microprocessor with modular software architecture comprising at least a microprocessor (11), a memory space (14, 16, 18), comprising:

means executing, in a privilege mode allowing writing into memory that is otherwise read-only, during an inter-module call, before branching the execution to a precise point in the program of the called module:

to automatically write with hardware means, into a location for storing calling module information, information used to identify the calling module in protected memory, written calling module identification information being hardware secured, to identify an identification and program chaining check routine specific to the called module among several identification and program chaining routines; and to use the identified identification and program chaining check routine, checking said written identification information of the calling module.

7. An integrated circuit card, comprising an electronic unit with microprocessor according to claim 6.

8. A computer readable storage medium comprising a computer program including program code instructions to implement the method according to any of claim 1 through 5 when said program is executed in a data processing system.

* * * * *